US012570092B2

(12) United States Patent
Kimoto

(10) Patent No.: US 12,570,092 B2
(45) Date of Patent: Mar. 10, 2026

(54) THERMAL PRINT HEAD

(71) Applicant: ROHM CO., LTD., Kyoto (JP)

(72) Inventor: Satoshi Kimoto, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 139 days.

(21) Appl. No.: 18/654,422

(22) Filed: May 3, 2024

(65) Prior Publication Data

US 2024/0375411 A1 Nov. 14, 2024

(30) Foreign Application Priority Data

May 10, 2023 (JP) ................................ 2023-078079

(51) Int. Cl.
*B41J 2/335* (2006.01)

(52) U.S. Cl.
CPC ........... *B41J 2/3351* (2013.01); *B41J 2/3353* (2013.01); *B41J 2/33535* (2013.01); *B41J 2/3354* (2013.01); *B41J 2/33545* (2013.01); *B41J 2/3357* (2013.01); *B41J 2/33595* (2013.01); *B41J 2/33505* (2013.01); *B41J 2/33515* (2013.01); *B41J 2/33525* (2013.01)

(58) Field of Classification Search
CPC .... B41J 2/3351; B41J 2/3353; B41J 2/33535; B41J 2/3354; B41J 2/33545; B41J 2/3357; B41J 2/33595; B41J 2/33505; B41J 2/33515; B41J 2/33525
See application file for complete search history.

(56) References Cited

U.S. PATENT DOCUMENTS

2005/0200691 A1* 9/2005 Yamakawa ............ B41J 2/3351
347/203
2016/0332456 A1* 11/2016 Daicho ................ B41J 2/33545

FOREIGN PATENT DOCUMENTS

JP 2012071520 A * 4/2012 .............. B41J 2/345
JP 2022180152 A 12/2022
WO WO-0076775 A1 * 12/2000 .......... B41J 2/33525

* cited by examiner

*Primary Examiner* — Yaovi M Ameh
(74) *Attorney, Agent, or Firm* — HSML P.C.

(57) ABSTRACT

A thermal print head includes: a substrate including a main surface; an insulating film arranged on the main surface; a first wiring layer arranged on the insulating film; a first interlayer insulating film arranged on the first wiring layer; a heat-generating body film; and a second wiring layer arranged on the first interlayer insulating film with the heat-generating body film interposed therebetween, wherein a bump is formed on the main surface, wherein the bump extends along a first direction in a plan view, wherein the second wiring layer extends along a second direction orthogonal to the first direction to intersect the bump in a plan view, and includes first, second, third, and fourth wirings arranged along the first direction, wherein the second wiring is located between the first wiring and the third wiring, and wherein the third wiring is located between the second wiring and the fourth wiring.

5 Claims, 12 Drawing Sheets

THERMAL PRINT HEAD

CROSS-REFERENCE TO RELATED APPLICATION

This application is based upon and claims the benefit of priority from Japanese Patent Application No. 2023-078079, filed on May 10, 2023, the entire contents of which are incorporated herein by reference.

TECHNICAL FIELD

The present disclosure relates to a thermal print head.

BACKGROUND

For example, in the related art, there is known a thermal print head. The thermal print head includes a substrate, a resistor layer, and a wiring layer.

The substrate includes a main surface. A protrusion is formed on the main surface. The protrusion extends along a first direction in a plan view. The wiring layer is arranged on the main surface with the resistor layer interposed therebetween. The wiring layer includes a common electrode and a plurality of individual electrodes.

The common electrode includes a first base and a plurality of first extensions. The first base extends along the first direction in a plan view. The first extensions extend from the first base along a second direction. The second direction is a direction orthogonal to the first direction. Tips of the first extensions overlap with the protrusion in a plan view. The first extensions are arranged at intervals in the first direction. Each of the individual electrodes includes a second base and a second extension. The second extension extends from the second base along the second direction. A tip of the second extension overlaps with the protrusion in a plan view, and faces the tips of the first extensions with a gap left therebetween. That is, the resistor layer under the wiring layer is exposed from between the tips of the first extensions and the tip of the second extension.

The second bases are staggered along the first direction. The second bases are connected to a driver IC by a wire. As described above, in the thermal print head of the related art, a plurality of pads (second bases) used in wire bonding are arranged in a plurality of rows along the first direction.

BRIEF DESCRIPTION OF DRAWINGS

The accompanying drawings, which are incorporated in and constitute a part of the specification, illustrate embodiments of the present disclosure.

DETAILED DESCRIPTION

Figure 1:
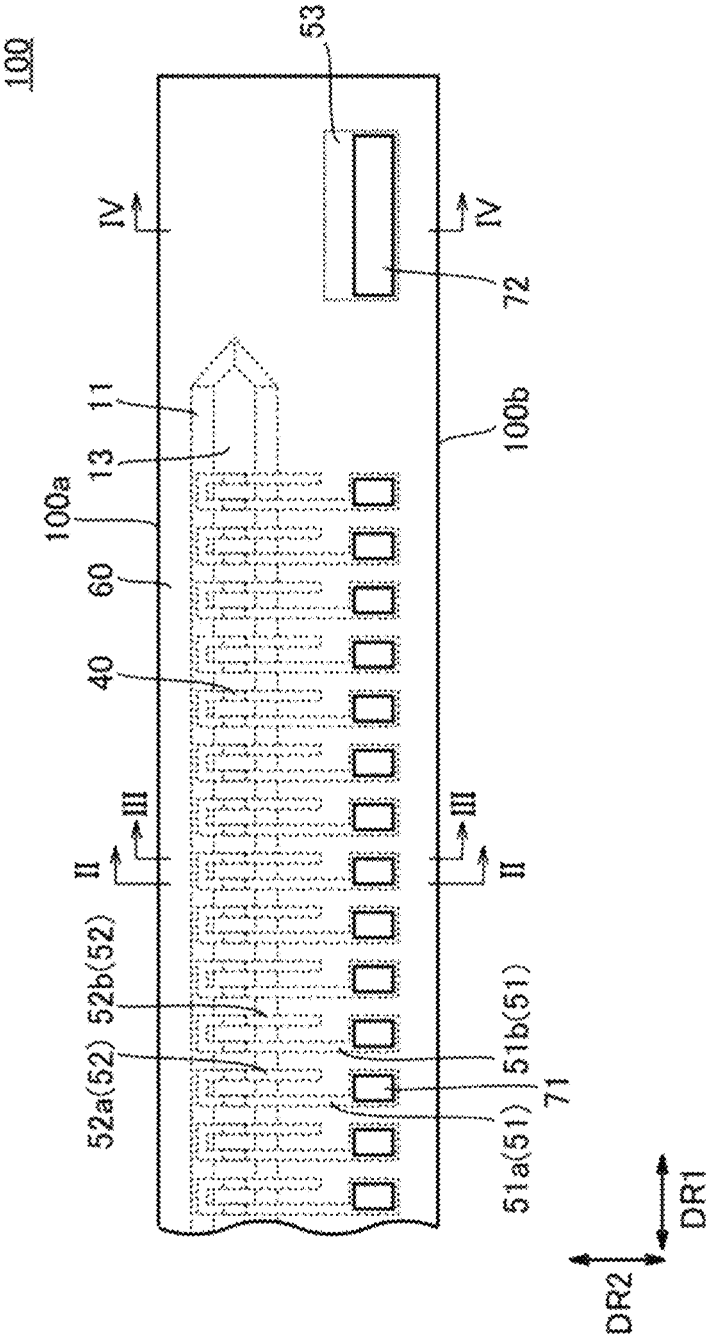
FIG. 1 is a plan view of a thermal print head.

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Details of embodiments of the present disclosure will be described with reference to the drawings. In the drawings described below, the same or corresponding parts will be designated by like reference numerals, and overlapping descriptions will not be repeated. A thermal print head according to the embodiments is referred to as a thermal print head 100.

(Configuration of Thermal Print Head 100)

A configuration of the thermal print head 100 will be described below.

Figure 2:
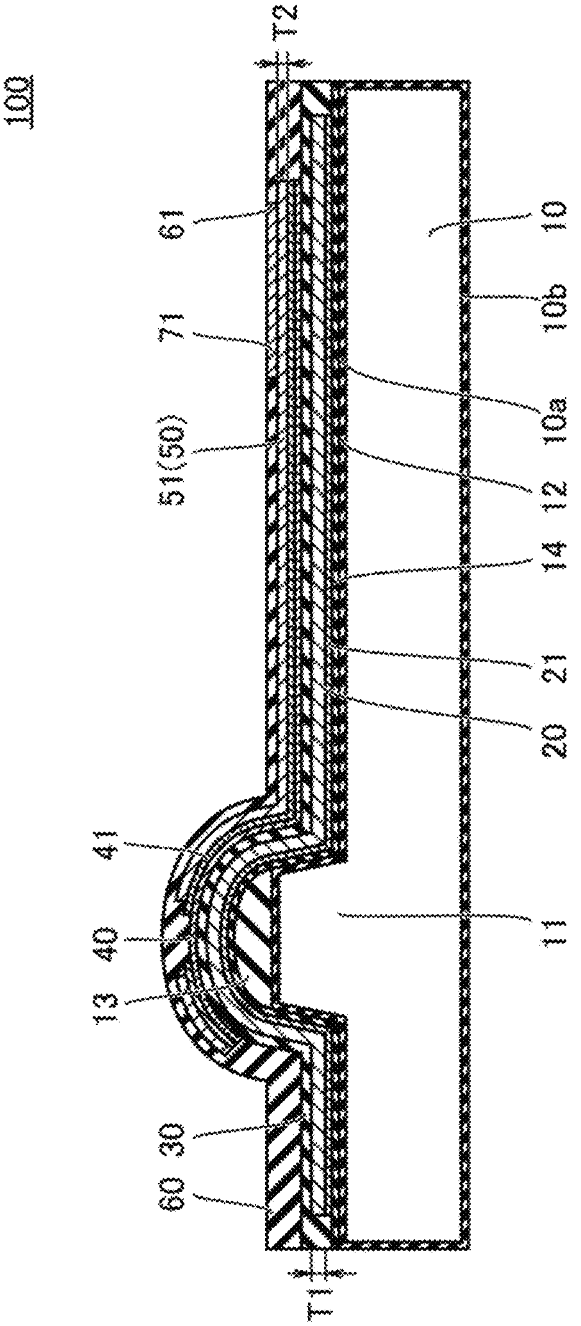
FIG. 2 is a cross-sectional view taken along line II-II in FIG. 1.
Figure 3:
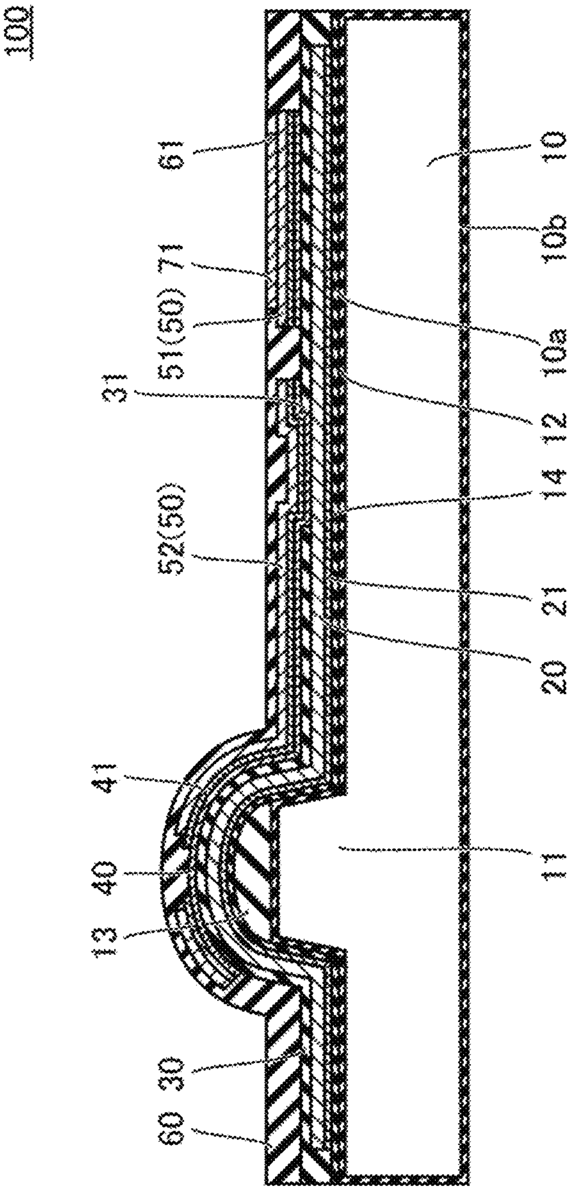
FIG. 3 is a cross-sectional view taken along line III-III in FIG. 1.
Figure 4:
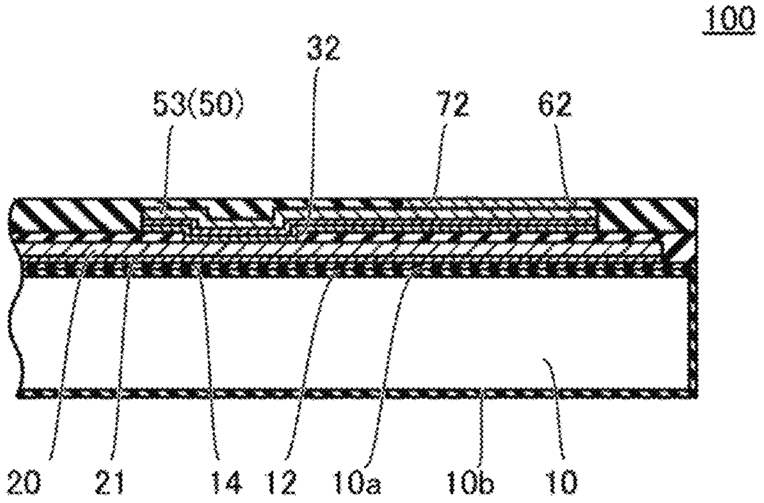
FIG. 4 is a cross-sectional view taken along line IV-IV in FIG. 1.
Figure 5:
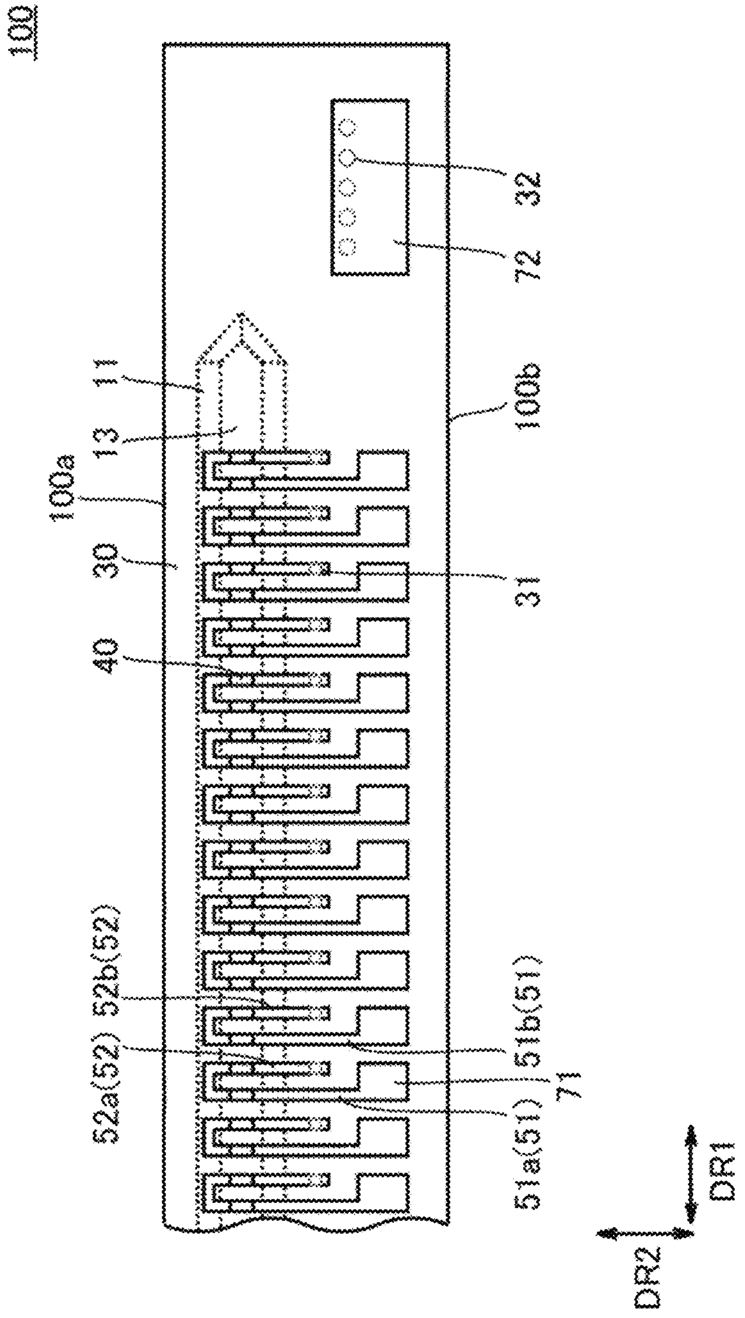
FIG. 5 is a plan view of the thermal print head in which an interlayer insulating film, a pad, and a pad are not shown.

FIG. 1 is a plan view of the thermal print head 100. FIG. 2 is a cross-sectional view taken along line II-II in FIG. 1. FIG. 3 is a cross-sectional view taken along line III-III in FIG. 1. FIG. 4 is a cross-sectional view taken along line IV-IV in FIG. 1. FIG. 5 is a plan view of the thermal print head 100 in which an interlayer insulating film 60, a pad 71, and a pad 72 are not shown. As shown in FIGS. 1 to 5, the thermal print head 100 includes a substrate 10, a wiring layer 20, an interlayer insulating film 30, a heat-generating body film 40, a wiring layer 50, an interlayer insulating film 60, a plurality of pads 71, and a pad 72.

Constituent material of the substrate 10 is, for example, monocrystalline silicon. However, the constituent material of the substrate 10 is not limited thereto. The substrate 10 includes a main surface 10*a* and a main surface 10*b*. The main surface 10*a* and the main surface 10*b* are end surfaces of the substrate 10 in a thickness direction. The main surface 10*b* is a surface opposite to the main surface 10*a*.

A bump 11 is formed on the main surface 10*a*. The bump 11 extends along a first direction in a plan view. A first direction DR1 corresponds to a longitudinal direction of the thermal print head 100 in a plan view. A second direction DR2 is a direction orthogonal to the first direction DR1 in a plan view.

An insulating film 12 may be formed on the surface of the substrate 10 including the main surface 10*a*. The constituent material of the insulating film 12 is, for example, silicon oxide. A glaze layer 13 may be formed on a top surface of the bump 11 with the insulating film 12 interposed therebetween. Constituent material of the glaze layer 13 is, for example, a glass material. An insulating film 14 may be formed on the insulating film 12 so as to cover the glaze layer 13. Constituent material of the insulating film 14 is, for example, silicon oxide.

Constituent material of the wiring layer 20 is, for example, copper, aluminum, or aluminum-copper alloy. A thickness of the wiring layer 20 is assumed to be a thickness T1. The wiring layer 20 is arranged on the main surface 10*a*. The wiring layer 20 may be arranged over the entire surface of the insulating film 14. Even in a case where the wiring layer 20 is removed from an outer periphery of the substrate 10, the wiring layer 20 is considered to be disposed over the entire surface of the insulating film 14. The wiring layer 20 includes, for example, a first layer and a second layer. The second layer is disposed on the first layer. A thickness of the second layer is greater than a thickness of the first layer. An adhesion layer 21 may be interposed between the wiring layer 20 and the insulating film 14. Constituent material of the adhesion layer 21 is, for example, titanium.

Constituent material of the interlayer insulating film 30 is, for example, silicon oxide. The interlayer insulating film 30 is arranged on the wiring layer 20. A plurality of contacts 31 and contacts 32 are formed at the interlayer insulating film 30. The wiring layer 20 is exposed from the contacts 31 and 32.

The wiring layer 50 is arranged on the interlayer insulating film 30 with the heat-generating body film 40 interposed therebetween. Constituent material of the heat-generating body film 40 is, for example, tantalum nitride. Constituent material of the wiring layer 50 is, for example, copper, aluminum, or aluminum-copper alloy. A heat transfer suppression layer 41 is interposed between the heat-generating body film 40 and the wiring layer 50. Constituent material of the heat transfer suppression layer 41 is, for example, titanium.

A thickness of the wiring layer 50 is assumed to be a thickness T2. The thickness T1 may be greater than the thickness T2. Further, the thickness T1 may be 5 times or more or 7 times or more the thickness T2. The wiring layer 50 includes a plurality of wirings 51 and a plurality of wirings 52. The wirings 51 and the wirings 52 extend along the second direction DR2 so as to intersect with the bump 11 in a plan view. The wirings 51 and the wirings 52 are arranged alternately along the first direction DR1 in a plan view.

The plurality of wirings 51 include wirings 51*a* and wirings 51*b*. The plurality of wirings 52 include wirings 52*a* and wirings 52*b*. The wirings 51*b* are located between the wirings 51*a* and the wirings 52*a* in the second direction DR2. The wirings 52*a* are located between the wirings 51*b* and the wirings 52*b* in the second direction DR2. From another viewpoint, the wirings 51*a*, the wirings 52*a*, the wirings 51*b*, and the wirings 52*b* are arranged side by side in the named order along the second direction DR2.

The thermal print head 100 includes a first end 100*a* and a second end 100*b* in a plan view. The first end 100*a* and the second end 100*b* are both ends of the thermal print head 100 in the second direction DR2. The bump 11 is located closer to the first end 100*a* than the second end 100*b* in the second direction DR2.

The wiring 51 includes one end and the other end in the second direction DR2. The one end of the wiring 51 in the second direction DR2 is closer to the first end 100*a* than the other end of the wiring 51 in the second direction DR2 in a plan view. The wiring 52 includes one end and the other end in the second direction DR2. The one end of the wiring 52 in the second direction DR2 is closer to the first end 100*a* than the other end of the wiring 52 in the second direction DR2 in a plan view. For example, one end of the wiring 51 in the second direction DR2 and one end of the wiring 52 in the second direction DR2 overlap with the bump 11 at a position closer to the first end 100*a* than the glaze layer 13 in a plan view.

The other end of the wiring 52 is arranged on a portion of the wiring layer 20 exposed from the contact 31. Thus, the other end of the wiring 52 is electrically connected to the wiring layer 20. The wiring layer 50 further includes a relay portion 53. A part of the relay portion 53 is arranged on a portion of the wiring layer 20 exposed from the contact 32. Thus, the relay portion 53 is electrically connected to the wiring layer 20.

One end of the wiring 51*a* in the second direction DR2 is connected to one end of the wiring 52*a* in the second direction DR2. One end of the wiring 51*b* in the second direction DR2 is connected to the other end of the wiring 52*b* in the second direction DR2.

The wiring 51 and the heat transfer suppression layer 41 under the wiring 51 are partially removed at a position overlapping with the bump 11 (more specifically, a position overlapping with the glaze layer 13) in a plan view. The heat-generating body film 40 is exposed from the removed portion of the wiring 51 and the heat transfer suppression layer 41. The heat-generating body film 40 and the heat transfer suppression layer 41 are exposed from the removed portion of the wiring 51. The removed portion of the wiring 51 is spaced apart from one end of the wiring 51 in the second direction DR2.

The wiring 52 and the heat transfer suppression layer 41 under the wiring 52 are partially removed at a position overlapping with the bump 11 (more specifically, a position overlapping with the glaze layer 13) in a plan view. The heat-generating body film 40 is exposed from the removed portion of the wiring 52 and the heat transfer suppression layer 41. The heat-generating body film 40 and the heat transfer suppression layer 41 are exposed from the removed portion of the wiring 52. The removed portion of the wiring 52 is spaced apart from one end of the wiring 52 in the second direction DR2.

The interlayer insulating film 60 is arranged on the interlayer insulating film 30 so as to cover the portion of the heat transfer suppression layer 41 exposed from the wiring layer 50 and the wiring 51, the portion of the heat transfer suppression layer 41 exposed from the wiring 52, the portion of the heat-generating body film 40 exposed from the wiring 51 and the heat transfer suppression layer 41 under the wiring 51, and the portion of the heat-generating body film 40 exposed from the wiring 52 and the heat transfer suppression layer 41 under the wiring 52. Constituent material of the interlayer insulating film 60 is, for example, silicon nitride.

A plurality of through-holes 61 and through-holes 62 are formed in the interlayer insulating film 60. The other end of the wiring 51 (the wiring 51*a* and the wiring 51*b*) in the second direction DR2 is exposed from the through-holes 61. The relay portion 53 is exposed from the through-holes 62. The plurality of through-holes 61 and through-holes 62 may be arranged in a line along the second direction DR2.

The pad 71 is arranged on the other end of the wiring 51 (the wiring 51*a* and the wiring 51*b*) in the second direction DR2 exposed from the through-hole 61, and the pad 72 is arranged on a part of the relay portion 53 exposed from the through-hole 62. Thus, the pad 71 is electrically connected to the other end of the wiring 51 (the wiring 51*a* and the wiring 51*b*) in the second direction DR2, and the pad 72 is electrically connected to the relay portion 53. Since the relay portion 53 is electrically connected to the wiring layer 20 as described above, the pad 72 is electrically connected to the wiring layer 20. The pads 71 and 72 are constituted by, for example, a nickel layer, a palladium layer disposed on the nickel layer, and a gold layer disposed on the palladium layer.

As described above, the plurality of through-holes 61 and through-holes 62 are arranged in a line along the second direction DR2. Therefore, the pads 71 and 72 are arranged in a line along the second direction DR2.

(Operation of Thermal Print Head 100)

An operation of the thermal print head 100 will be described below.

The pad 72 is electrically connected to the wiring layer 20, and the wiring layer 20 is electrically connected to the other end of the wiring 52 in the second direction DR2. Therefore, a common potential is supplied to the plurality of wirings 52 from the pad 72.

An output terminal of a driver IC (not shown) is electrically connected to the pad 71 via a bonding wire or a flexible printed circuit (FPC). Thus, each of the plurality of wirings 51 is selectively supplied with an output potential from the driver IC. As a result, the heat-generating body film 40, which is exposed from the wiring 51 that is supplied with the potential and the wiring 52 connected to the wiring 51, selectively generates heat. When paper is brought into contact with the interlayer insulating film 60 over the heat-generating body film 40 that is configured to selectively generate heat, printing is performed on the paper.

(Method of Manufacturing Thermal Print Head 100)

A method of manufacturing the thermal print head 100 will be described below.

Figure 6:
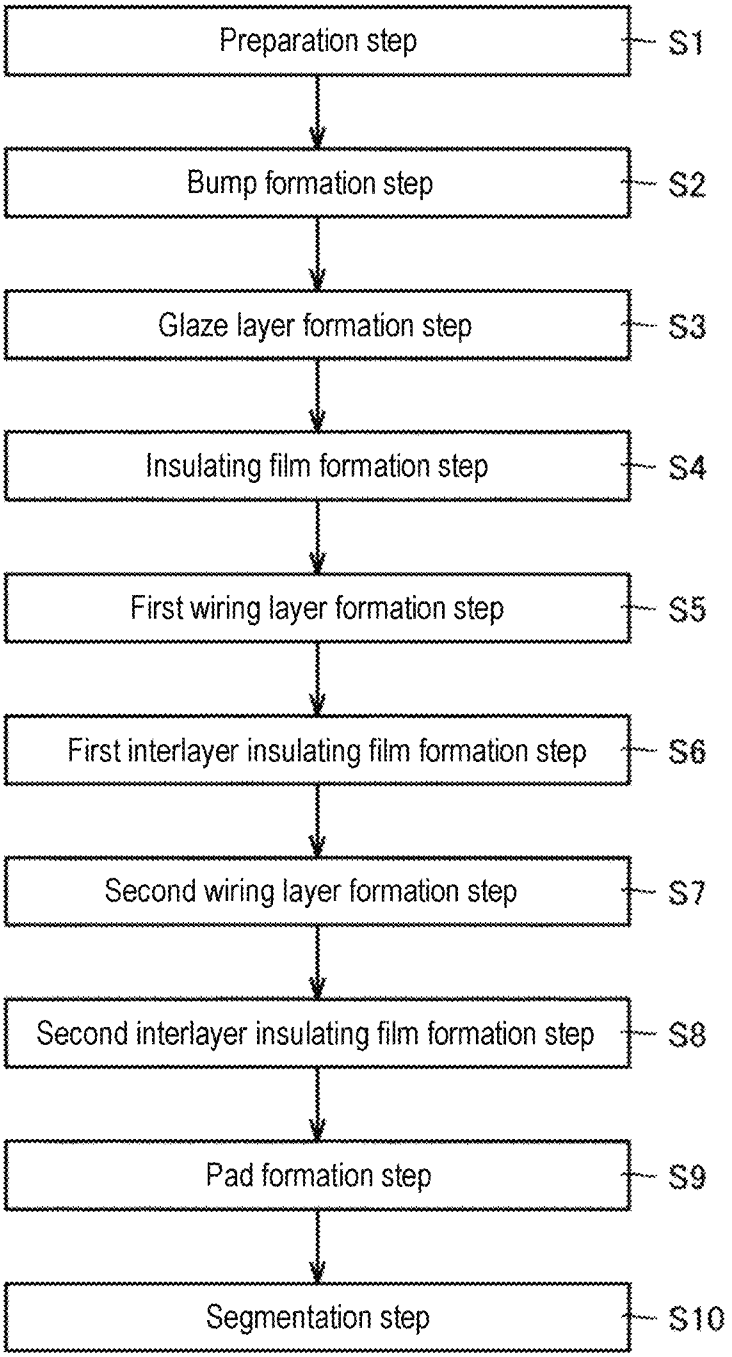
FIG. 6 is a diagram showing a manufacturing process of the thermal print head.

FIG. 6 is a diagram showing a manufacturing process of the thermal print head 100. As shown in FIG. 6, the method of manufacturing the thermal print head 100 includes a preparation step S1, a bump formation step S2, a glaze layer formation step S3, an insulating film formation step S4, a first wiring layer formation step S5, a first interlayer insulating film formation step S6, a second wiring layer formation step S7, a second interlayer insulating film formation step S8, a pad formation step S9, and a segmentation step S10.

Figure 7:
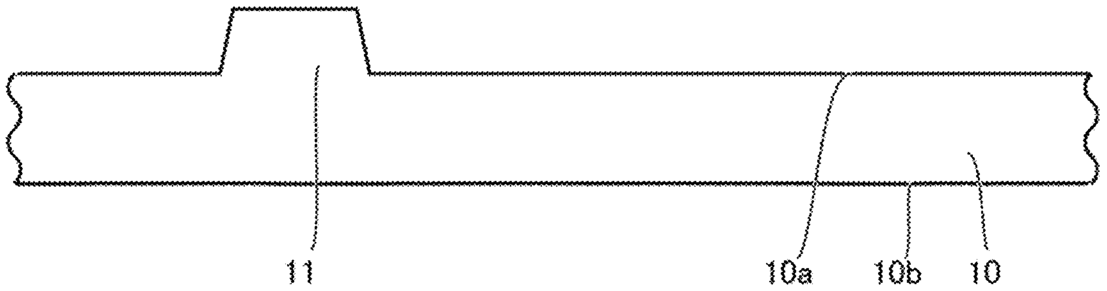
FIG. 7 is a cross-sectional view showing a bump formation step S2.

In the preparation step S1, a substrate 10 is prepared. FIG. 7 is a cross-sectional view illustrating the bump formation step S2. As shown in FIG. 7, in the bump formation step S2, a bump 11 is formed. In the bump formation step S2, firstly, a hard mask is formed on the main surface 10*a*. The hard mask is formed by depositing constituent material (e.g., silicon nitride) of the hard mask on the surface of the substrate 10 and patterning the constituent material of the hard mask deposited on the main surface 10*a*. The deposition of the constituent material of the hard mask is performed by using, for example, a low-pressure chemical vapor deposition (CVD) method, and the patterning of the constituent material of the hard mask is performed by dry etching such as reactive ion etching (RIE) or the like where a resist pattern formed by photolithography is used as a mask. Since the dry etching (RIE) is performed on the constituent material of the hard mask on the main surface 10*a*, the constituent material of the hard mask remains on the surface of the substrate 10 other than the main surface 10*a*.

Secondly, wet etching is performed by using the hard mask and the constituent material of the hard mask on the surface of the substrate 10 other than the main surface 10*a*. This wet etching is performed by using, for example, an aqueous potassium hydroxide solution. Thirdly, the constituent material of the hard mask remaining on the surfaces other than the hard mask and main surface 10*a* is removed by wet etching. This wet etching is performed by using, for example, hydrofluoric acid. As a result, a bump 11 is formed on the main surface 10*a*.

Figure 8:
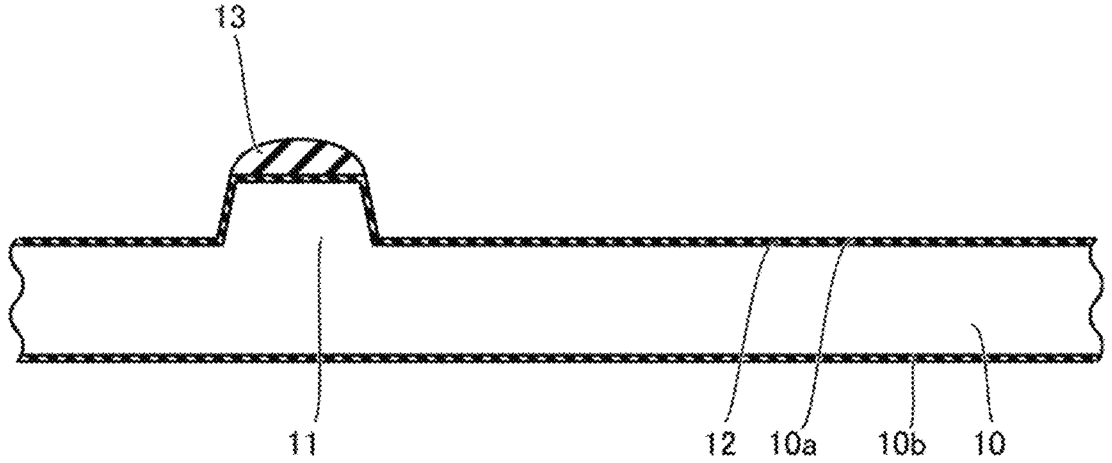
FIG. 8 is a cross-sectional view showing a glaze layer formation step S3.
Figure 9:
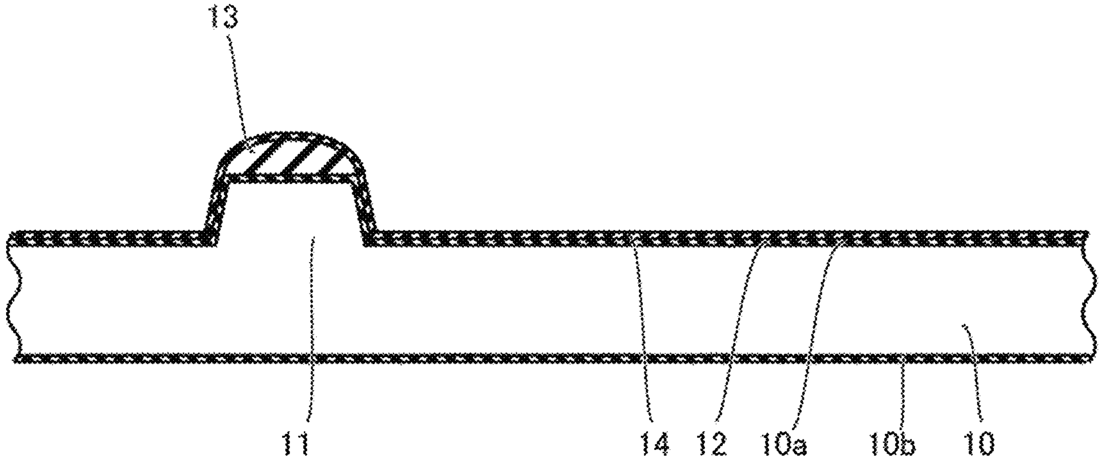
FIG. 9 is a cross-sectional view showing an insulating film formation step S4.

FIG. 8 is a cross-sectional view illustrating the glaze layer formation step S3. As shown in FIG. 8, in the glaze layer formation step S3, an insulating film 12 and a glaze layer 13 are formed. In the glaze layer formation step S3, firstly, thermal oxidation, LP (Low Pressure)-CVD, or the like is performed to form an insulating film 12. Secondly, a glaze layer 13 is formed. The glaze layer 13 is formed, for example, by applying a paste containing a glass material onto the top surface of the bump 11 by using a dispenser, screen printing, or the like with the insulating film 12 interposed therebetween and baking the applied paste. FIG. 9 is a cross-sectional view illustrating the insulating film formation step S4. As shown in FIG. 9, in the insulating film formation step S4, an insulating film 14 is formed. The insulating film 14 is formed by a plasma CVD method where TEOS (tetraethoxysilane) or the like is used.

Figure 10:
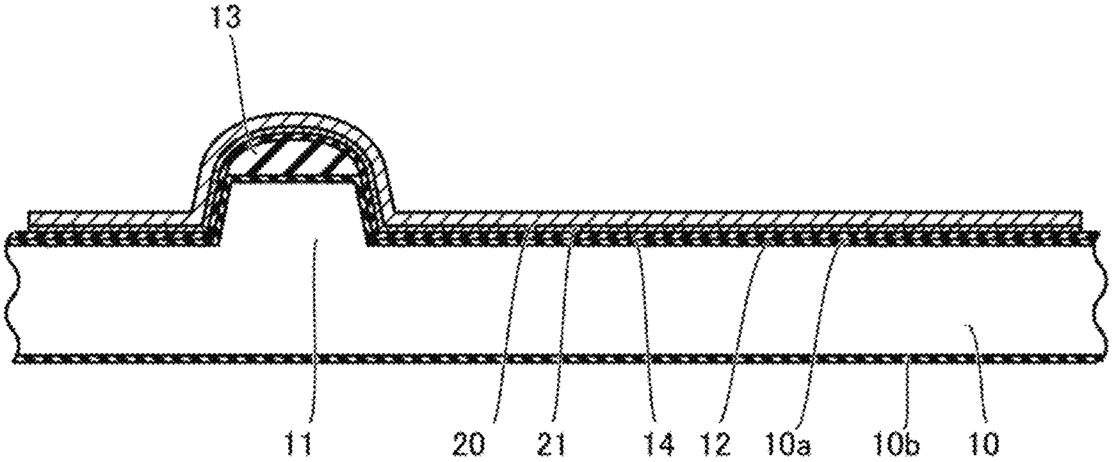
FIG. 10 is a cross-sectional view showing a first wiring layer formation step S5.

FIG. 10 is a cross-sectional view illustrating the first wiring layer formation step S5. As shown in FIG. 10, in the first wiring layer formation step S5, a wiring layer 20 and an adhesion layer 21 are formed. In the first wiring layer formation step S5, firstly, the adhesion layer 21 and the first layer of the wiring layer 20 are sequentially formed by, for example, sputtering. Secondly, by performing an electrolytic plating by using the first layer of the wiring layer 20 as a seed layer, a second layer of the wiring layer 20 grows, and the wiring layer 20 is formed. After the wiring layer 20 is formed, the wiring layer 20 and the adhesion layer 21 may be patterned (for example, the wiring layer 20 and the adhesion layer 21 at the outer periphery are removed). This patterning is performed by, for example, wet etching.

Figure 11:
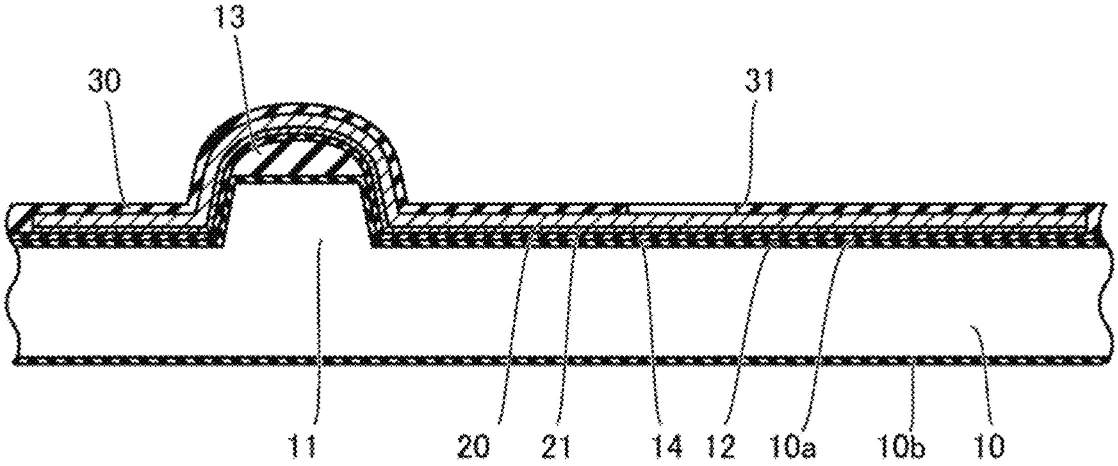
FIG. 11 is a cross-sectional view showing a first interlayer insulating film formation step S6.

FIG. 11 is a cross-sectional view illustrating the first interlayer insulating film formation step S6. As shown in FIG. 11, an interlayer insulating film 30 is formed. In the first interlayer insulating film formation step S6, firstly, constituent material of the interlayer insulating film 30 is deposited by, for example, a plasma CVD method. Secondly, a resist pattern is formed on the deposited constituent material of the interlayer insulating film 30. The resist pattern includes openings at positions corresponding to the contacts 31 and 32 (not shown in FIG. 11). The resist pattern is formed by photolithography. Thirdly, the contacts 31 and 32 (not shown in FIG. 11) are formed by performing dry etching such as RIE or the like by using the resist pattern as a mask.

Figure 12A:
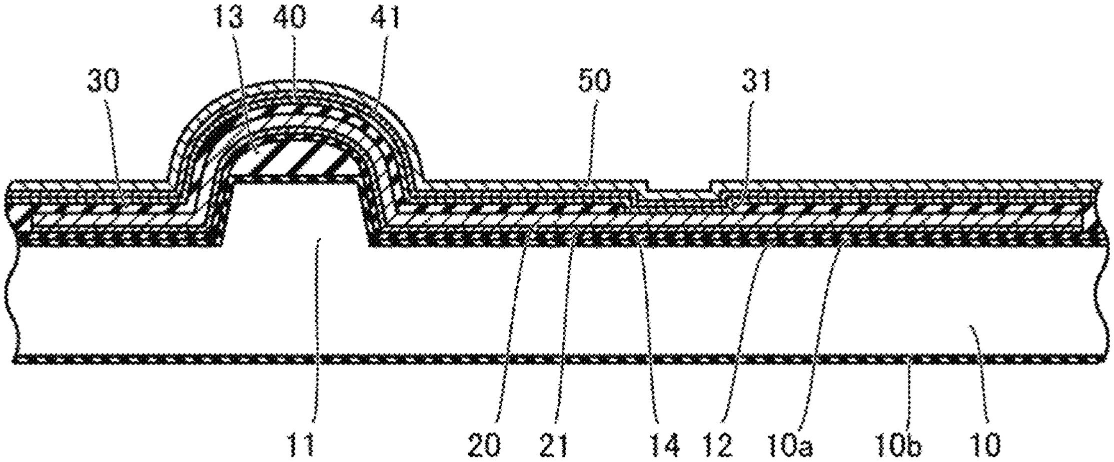
FIG. 12A is a first cross-sectional view illustrating a second wiring layer formation step S7.
Figure 12B:
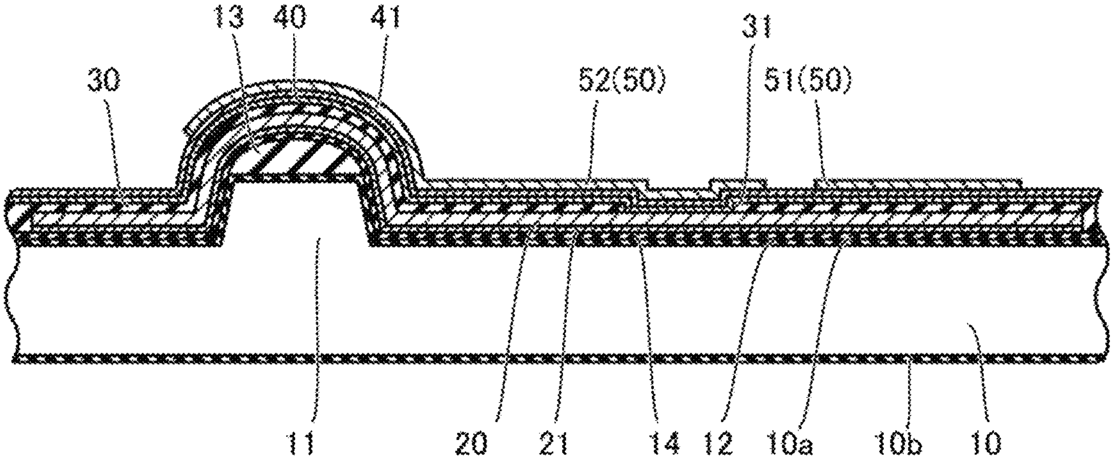
FIG. 12B is a second cross-sectional view illustrating the second wiring layer formation step S7.

FIG. 12A is a first cross-sectional view illustrating the second wiring layer formation step S7. As shown in FIG. 12A, in the second wiring layer formation step S7, firstly, constituent material of the heat-generating body film 40, constituent material of the heat transfer suppression layer 41, and constituent material of the wiring layer 50 are sequentially deposited on the interlayer insulating film 30, for example, by sputtering. FIG. 12B is a second cross-sectional view illustrating the second wiring layer formation step S7. As shown in FIG. 12B, in the second wiring layer formation step S7, secondly, the constituent material of the deposited wiring layer 50 is patterned to form the wiring 51, the wiring

52, and the relay portion 53 (not shown in FIG. 12B). This patterning is performed by wet etching where the resist pattern formed by photolithography is used as a mask.

Figure 12C:
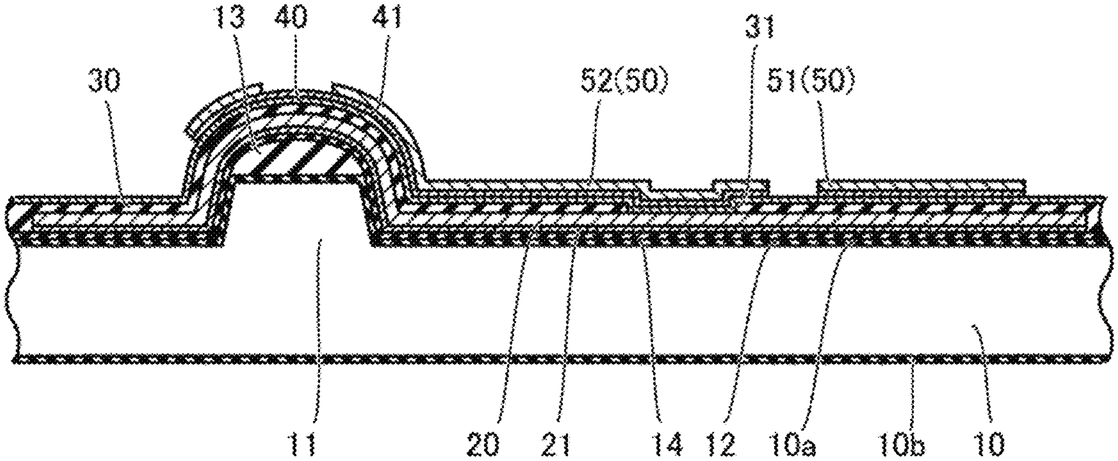
FIG. 12C is a third cross-sectional view illustrating the second wiring layer formation step S7.

In the second wiring layer formation step S7, thirdly, the deposited constituent material of the heat transfer suppression layer 41 is patterned to form the heat transfer suppression layer 41. This patterning is performed by wet etching where the wirings 51 and 52 and the relay portion 53 are used as masks. FIG. 12C is a third cross-sectional view illustrating the second wiring layer formation step S7. As shown in FIG. 12C, in the second wiring layer formation step S7, thirdly, the wiring 51 and the wiring 52 are partially removed. The partial removal of the wirings 51 and 52 is performed by wet etching where the resist pattern formed by photolithography is used as a mask.

Figure 12D:
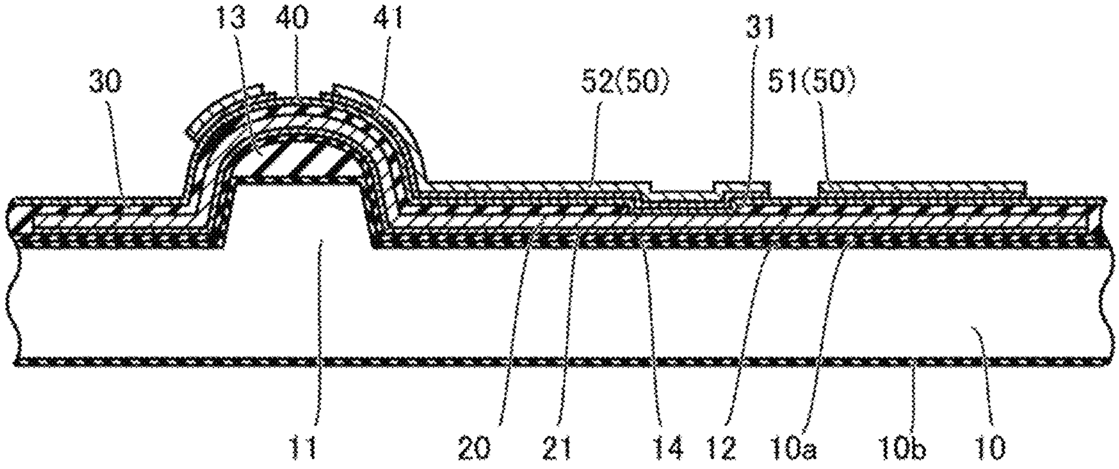
FIG. 12D is a fourth cross-sectional view illustrating the second wiring layer formation step S7.
Figure 12E:
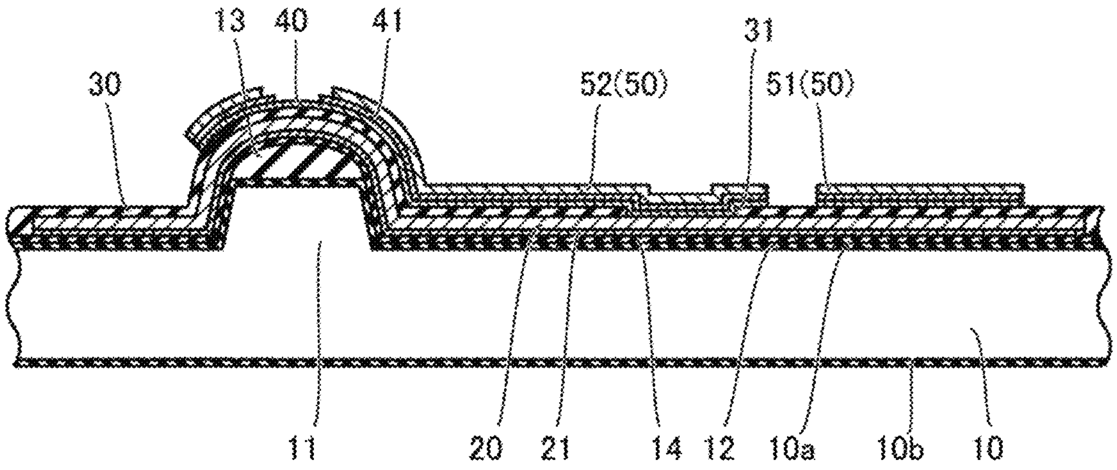
FIG. 12E is a fifth cross-sectional view illustrating the second wiring layer formation step S7.

FIG. 12D is a fourth cross-sectional view illustrating the second wiring layer formation step S7. As shown in FIG. 12D, in the second wiring layer formation step S7, fourthly, the heat transfer suppression layer 41 exposed from the wiring 51 and the heat transfer suppression layer 41 exposed from the wiring 52 are partially removed. The partial removal of the heat transfer suppression layer 41 is performed by wet etching where the resist pattern formed by photolithography is used as a mask. FIG. 12E is a fifth cross-sectional view illustrating the second wiring layer formation step S7. As shown in FIG. 12E, in the second wiring layer formation step S7, fifthly, the constituent material of the heat-generating body film 40 is patterned. This patterning is performed by dry etching such as RIE or the like where the resist pattern formed by photolithography is used as a mask.

Figure 13:
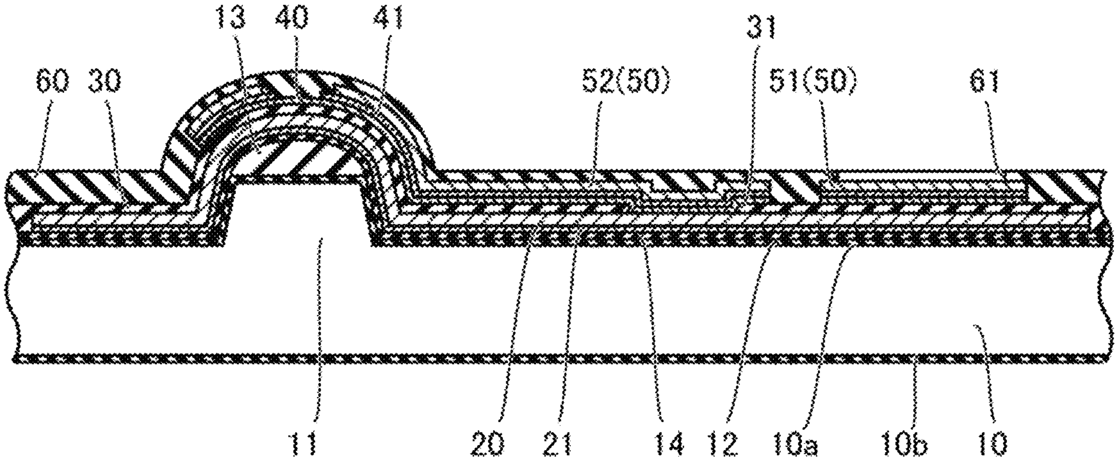
FIG. 13 is a cross-sectional view illustrating a second interlayer insulating film formation step S8.

FIG. 13 is a cross-sectional view illustrating the second interlayer insulating film formation step S8. As shown in FIG. 13, in the second interlayer insulating film formation step S8, firstly, constituent material of the interlayer insulating film 60 is deposited by, for example, a plasma CVD method. Secondly, a resist pattern is formed on the deposited constituent material of the interlayer insulating film 60. The resist pattern includes openings at positions corresponding to the through-holes 61 and 62 (not shown in FIG. 13). The resist pattern is formed by photolithography. Thirdly, by performing dry etching such as RIE or the like where the resist pattern is used as a mask, through-holes 61 and through-holes 62 (not shown in FIG. 13) are formed.

In the pad formation step S9, pads 71 and 72 are formed. The pad 71 (pad 72) is formed by sequentially growing the respective layers constituting the pad 71 (pad 72), for example, by electroless plating. In the segmentation step S10, the substrate 10 is diced to obtain a plurality of thermal print heads 100 having the structure shown in FIGS. 1 to 5.

<Effects of Thermal Print Head 100>

Effects of the thermal print head 100 will be described below. In the thermal print head 100, the other end of the wiring 52 in the second direction DR2 is electrically connected to the wiring layer 20, and the pad 72 is electrically connected to the wiring layer 20. Since there are few restrictions on the arrangement of the pads 72, it is possible to arrange the pads 71 and 72 in a line along the first direction DR1. Therefore, according to the thermal print head 100, it is possible to reduce a width (distance between the first end 100*a* and the second end 100*b*) of the thermal print head 100 in the second direction DR2.

In a case where the width of the thermal print head 100 in the second direction DR2 is reduced, a yield of the thermal print head 100 is improved because the manufacturing process is less susceptible to defects. Moreover, in a case where the width of the thermal print head 100 in the second direction DR2 is reduced, the number of thermal print heads 100 that may be manufactured from one wafer also increases.

In the thermal print head 100, since a current flows through the wiring layer 20 between the pad 72 and the other end of the wiring 52 in the second direction DR2, it is possible to suppress a voltage drop between the pad 72 and the other end of the wiring 52 in the second direction DR2. Further, when the thickness T1 is greater than the thickness T2 and/or when the wiring layer 20 is arranged over the entire surface of the insulating film 14, an electrical resistance value of the wiring layer 20 is further reduced, which makes it possible to further suppress a voltage drop between the pad 72 and the other end of the wiring 52 in the second direction DR2.

Supplementary Notes

The embodiments of the present disclosure include the following configurations.

Supplementary Note 1

A thermal print head, including:
- a substrate including a main surface;
- an insulating film arranged on the main surface;
- a first wiring layer arranged on the insulating film;
- a first interlayer insulating film arranged on the first wiring layer;
- a heat-generating body film; and
- a second wiring layer arranged on the first interlayer insulating film with the heat-generating body film interposed therebetween,
- wherein a bump is formed on the main surface,
- wherein the bump extends along a first direction in a plan view,
- wherein the second wiring layer extends along a second direction orthogonal to the first direction so as to intersect the bump in a plan view, and includes a first wiring, a second wiring, a third wiring, and a fourth wiring arranged along the first direction,
- wherein the second wiring is located between the first wiring and the third wiring,
- wherein the third wiring is located between the second wiring and the fourth wiring,
- wherein one end of the first wiring in the second direction is connected to one end of the second wiring in the second direction,
- wherein one end of the third wiring in the second direction is connected to one end of the fourth wiring in the second direction,
- wherein the other end of the second wiring in the second direction and the other end of the fourth wiring in the second direction are electrically connected to the first wiring layer, and
- wherein the first wiring, the second wiring, the third wiring, and the fourth wiring are partially removed such that the heat-generating body film is exposed at a position overlapping with the bump in a plan view.

Supplementary Note 2

The thermal print head of Supplementary Note 1, further including:
- a first pad, a second pad, and a third pad,
- wherein the other end of the first wiring in the second direction and the other end of the third wiring in the second direction are electrically connected to the first pad and the second pad, respectively, wherein the first wiring layer is electrically connected to the third pad, and wherein the first pad, the second pad, and the third pad are arranged along the first direction in a plan view.

Supplementary Note 3

The thermal print head of Supplementary Note 1 or 2, wherein the first wiring layer is arranged over an entire surface of the insulating film.

Supplementary Note 4

The thermal print head of any one of Supplementary Notes 1 to 3, wherein a thickness of the first wiring layer is greater than a thickness of the second wiring layer.

Supplementary Note 5

The thermal print head of any one of Supplementary Notes 1 to 4, wherein the substrate is made of silicon.

Although the embodiments of the present disclosure have been described above, the embodiments described above may be modified in various ways. Moreover, the scope of the present disclosure is not limited to the above-described embodiments. The scope of the present disclosure is defined by the claims, and is intended to include all changes within the meaning and scope equivalent to the claims.

While certain embodiments have been described, these embodiments have been presented by way of example only, and are not intended to limit the scope of the disclosures. Indeed, the embodiments described herein may be embodied in a variety of other forms. Furthermore, various omissions, substitutions, and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A thermal print head, comprising:

a substrate including a main surface;

an insulating film arranged on the main surface;

a first wiring layer arranged on the insulating film;

a first interlayer insulating film arranged on the first wiring layer;

a heat-generating body film; and a second wiring layer arranged on the first interlayer insulating film with the heat-generating body film interposed therebetween, wherein a bump is formed on the main surface, wherein the bump extends along a first direction in a plan view, wherein the second wiring layer extends along a second direction orthogonal to the first direction so as to intersect the bump in a plan view, and includes a first wiring, a second wiring, a third wiring, and a fourth wiring arranged along the first direction, wherein the second wiring is located between the first wiring and the third wiring, wherein the third wiring is located between the second wiring and the fourth wiring, wherein one end of the first wiring in the second direction is connected to one end of the second wiring in the second direction, wherein one end of the third wiring in the second direction is connected to one end of the fourth wiring in the second direction, wherein the other end of the second wiring in the second direction and the other end of the fourth wiring in the second direction are electrically connected to the first wiring layer, and wherein the first wiring, the second wiring, the third wiring, and the fourth wiring are partially removed such that the heat-generating body film is exposed at a position overlapping with the bump in a plan view.

2. The thermal print head of claim 1, further comprising:

a first pad, a second pad, and a third pad, wherein the other end of the first wiring in the second direction and the other end of the third wiring in the second direction are electrically connected to the first pad and the second pad, respectively, wherein the first wiring layer is electrically connected to the third pad, and wherein the first pad, the second pad, and the third pad are arranged along the first direction in a plan view.

3. The thermal print head of claim 1, wherein the first wiring layer is arranged over an entire surface of the insulating film.

4. The thermal print head of claim 1, wherein a thickness of the first wiring layer is greater than a thickness of the second wiring layer.

5. The thermal print head of claim 1, wherein the substrate is made of silicon.

* * * * *